(12) United States Patent
Takaoka et al.

(10) Patent No.: US 6,481,902 B2
(45) Date of Patent: Nov. 19, 2002

(54) LIGHT TRANSMISSION DEVICE

(75) Inventors: Takashi Takaoka, Kitakatsuragi-gun (JP); Mitsuhisa Ikuta, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/791,468

(22) Filed: Feb. 23, 2001

(65) Prior Publication Data

US 2001/0017966 A1 Aug. 30, 2001

(30) Foreign Application Priority Data

Feb. 25, 2000 (JP) ........................................ 2000-048806
Aug. 7, 2000 (JP) ........................................ 2000-238586

(51) Int. Cl.⁷ ............................................... G02B 6/36
(52) U.S. Cl. ........................................... 385/92; 385/78
(58) Field of Search ........................... 385/72, 52, 60, 385/76, 77, 53; 387/79, 88, 78

(56) References Cited

U.S. PATENT DOCUMENTS 6,076,975 A * 6/2000 Roth ............................ 385/76
6,081,647 A * 6/2000 Roth et al. .................. 385/139
6,283,640 B1 * 11/2001 Stephenson et al. .......... 385/58
6,425,694 B1 * 7/2002 Szilagyi et al. ............. 385/139

FOREIGN PATENT DOCUMENTS

JP         6-331859      12/1994
JP         2000-131564    5/2000

* cited by examiner

*Primary Examiner*—Georgia Epps
*Assistant Examiner*—Omar Hindi
(74) *Attorney, Agent, or Firm*—Dike, Bronstein, Roberts & Cushman IP Group Edwards & Angell, LLP; David G. Conlin; David A. Tucker

(57) ABSTRACT

A light transmission device includes an optical fiber cable having a plug and a holder having a plug insertion hole into which the plug of the optical fiber cable is inserted, wherein an engaging projection is provided on an outer surface of the plug, an engaging groove corresponding with the projection is provided on a wall of the plug insertion hole, and a shutter for closing the plug insertion hole is provided, the shutter being opened and closed in the inside of the plug insertion hole by turning about a pivot extending substantially vertically or parallel to a line composed of an optional point in the groove and a point on a wall of the plug insertion hole rightly opposite to the optional point.

11 Claims, 17 Drawing Sheets

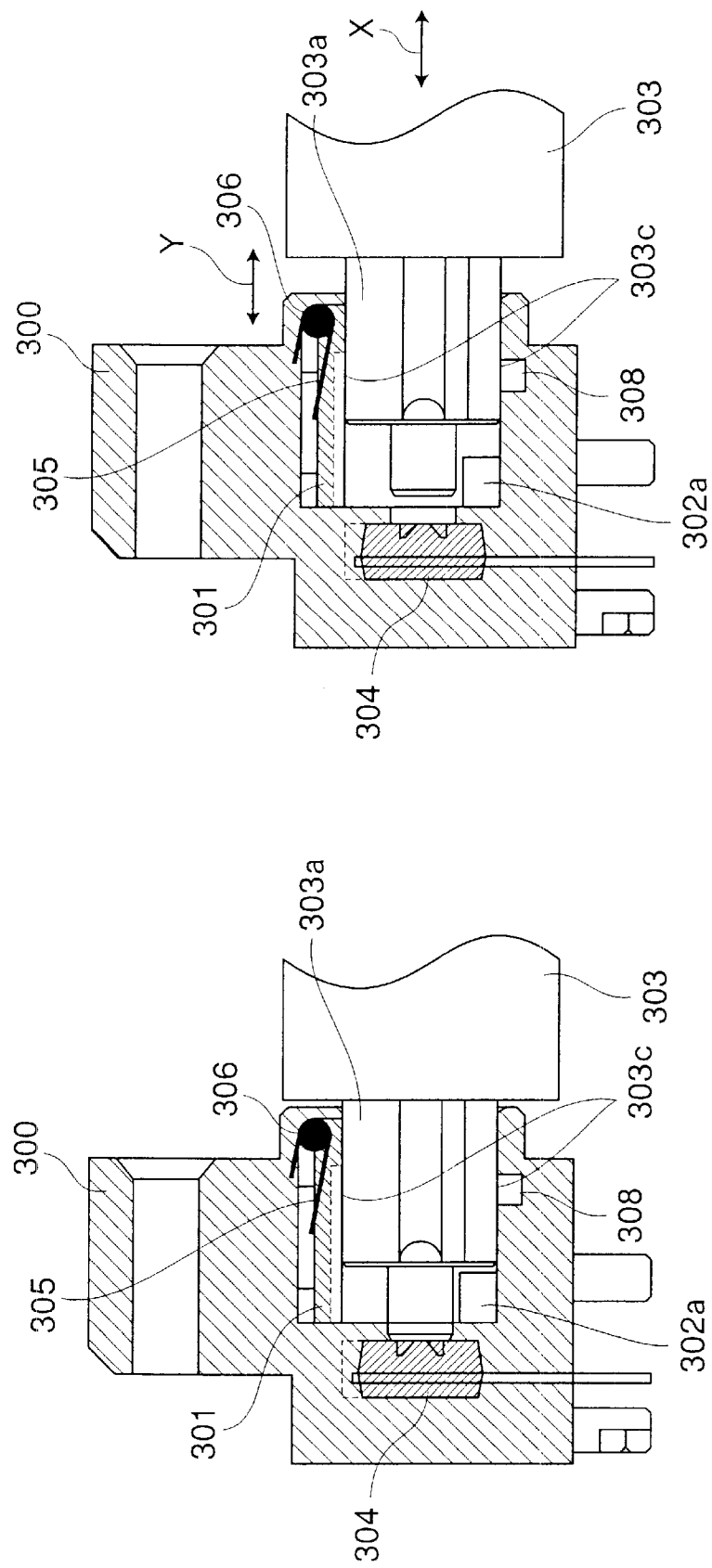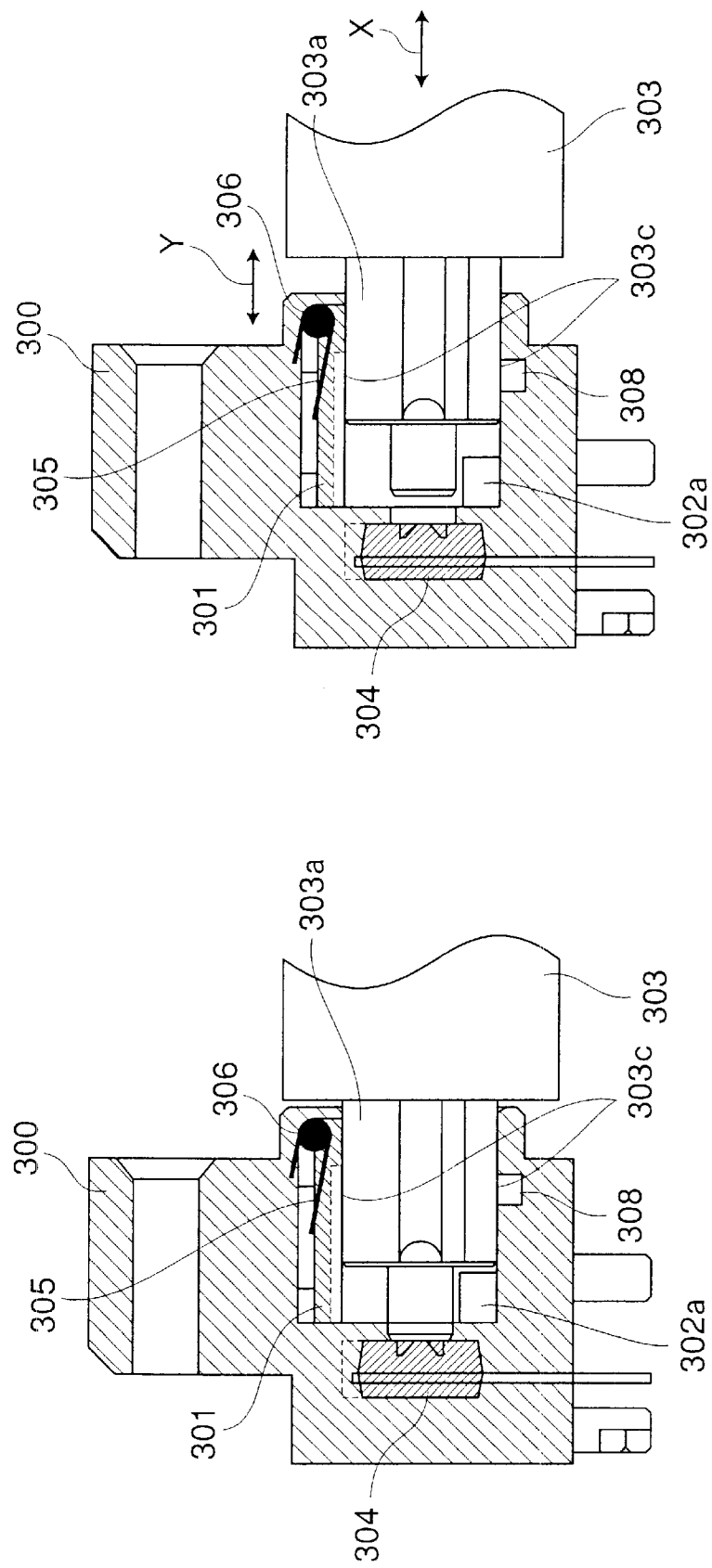

LIGHT TRANSMISSION DEVICE

CROSS-REFERENCES TO RELATED APPLICATIONS

This application is related to Japanese applications Nos. 2000-048806 and 2000-238586, filed on Feb. 25, 2000 and Aug. 7, 2000 whose priorities are claimed under 35 USC § 119, the disclosures of which are incorporated by reference in their entirety.

BACKGROUND OF THE INVENTION

1. Field of the Invention

The present invention relates to a light transmission device, in particular to a light transmission device provided for AV equipments and optical data transmission devices to allow light transmission by optically coupling an optical fiber cable inserted in an insertion hole of a holder and an optical element held in the insertion hole.

2. Description of Related Art

In recent years, transmission of digital signals through optical communication has been commonly carried out in consumer products. When the product is not used, a protective structure against dust, flux used for assembling a substrate and other foreign objects is provided for an optical/mechanical junction between a light emitting/receiving section of the product and a plug of an optical fiber cable.

FIGS. 8(a) to 9(b) illustrate a schematic structure of a first light transmission device according to the prior art in which a protective cap is utilized as such a protective structure. FIG. 8(a) is a side view and FIG. 8(b) is a front view observed from an open end of a plug insertion hole, both showing the state where the protective cap is inserted (shutter closed state). FIGS. 9(a) is a front view observed from the open end of the plug insertion hole and FIG. 9(b) is a side view, both showing the state where the protective cap is extracted (shutter opened state).

The first light transmission device according to the prior art shown in FIGS. 8(a) to 9(b) includes in a holder 100 an optical element for performing at least either emitting or receiving light. When the device is not used, a protective cap 101 is inserted in a plug insertion hole 12. The protective cap 101 is inserted/extracted along the direction of an arrow described in FIG. 9(b). That is, the plug insertion hole 102 of the light transmission device is completely shut by the protective cap 101 when the device is not used, i.e., when a plug of an optical fiber cable is not inserted in the plug insertion hole 12, so that entering of dust and foreign objects can be prevented.

However, the protective cap 101 requires a projected portion so that one can hold it, which makes the cap larger. Further, the protective cap 101 must be extracted to insert the optical fiber cable and the extracted protective cap 101 must be stored since it has to be re-inserted when the device is not used, which involves a possibility that children might swallow the cap if it is kept in a wrong place.

In connection with the above problem, FIGS. 10(a) to 11(b) schematically show a second light transmission device according to the prior art which does not use the protective cap 101 but employs a shutter 201 which opens outwardly. FIG. 10(a) is a side view and FIG. 10(b) is a front view observed from an open end of a plug insertion hole, both showing the state where the shutter 201 is closed. FIG. 11(a) is a front view observed from the open end of the plug insertion hole and FIG. 11(b) is a side view, both showing the state where the shutter 201 is opened.

The light transmission device includes in a holder 200 an optical element for performing at least either emitting or receiving light. When the device is not used, the plug insertion hole 202 of the light transmission device is shut and protected by the shutter 201. That is, as shown in FIG. 11(b), the shutter 201 is opened/closed along the direction of an arrow Y in accordance with the insertion/extraction of a plug 203a of an optical fiber cable 203 along the direction of an arrow X.

The shutter 201 eliminates the need of extracting the protective cap 101 to insert the optical fiber cable 203. Further, since the shutter 201 is attached to the light transmission device, it is unnecessary to store it and the device is used without any harmful possibilities.

However, the shutter 201 must be opened outwardly by a person to insert the cable 203, which is not so different from the first light transmission device. In some cases, he/she must close the shutter 201 if it remains opened after the plug 203a is extracted. Further, the size of the shutter 201 will be larger because a handle for opening/closing the shutter 201 is required.

FIGS. 12(a) to 13(b) schematically show a third light transmission device according to the prior art which does not use the protective cap 101 but employs a shutter 301 which opens inwardly. FIG. 12(a) is a sectional side view and FIG. 12(b) is a front view observed from an open end of the plug insertion hole, both showing the state where the shutter is closed. FIG. 13(a) is a front view observed from the open end of the plug insertion hole and FIG. 13(b) is a sectional side view, both showing the state where the shutter is opened.

The third light transmission device includes in a holder 300 an optical element 304 for performing at least either emitting or receiving light. When the device is not used, a plug insertion hole 302 of the light transmission device is shut and protected by the shutter 301.

In this construction, a spring 305 having a pair of arms is provided with a pivot 306. One of the arms contacts a rear surface of the shutter 301 and the other contacts an upper inner surface of the holder 300, so that the shutter 301 automatically opens/closes by turning about the pivot 306 in accordance with the insertion/extraction of a plug 303a of an optical fiber cable 303.

That is, the shutter 301 is closed so as to shut the plug insertion hole 302 when the device is not used. By pressing the plug 303a against the shutter 301, the shutter 301 turns about the pivot 306 to open towards the inside of the holder 300. When the plug 303a is extracted, the shutter 301 automatically returns to its original place by the returning force (elastic force) of the spring 305.

Thus, disadvantages of the second light transmission device, i.e., the need of manual opening and closing of the outwardly opening shutter 201 and the increase of its size, are eliminated.

However, the third light transmission device has the following problems unsolved.

The above-illustrated plug 303a of the optical fiber cable 303 is in a cube shape and a pair of belt-shaped projections (engaging projections) each having a semicircle section is provided (303b in FIG. 13(b)). Further, as shown in FIGS. 14(a) and 14(b), a pair of grooves 307 (engaging grooves) each having a semicircle section is provided in the opposite inner walls of the plug insertion hole 302 of the light transmission device to engage with the projections 303b. FIGS. 14(a) and 14(b) are front views observed from an open end of the plug insertion hole of the third transmission device, showing the state where the shutter is closed and opened, respectively.

The projections 303b are engaged with the grooves 307 to insert the plug 303a to a desired position so that the optical element 304 accommodated in the holder 300 and an edge of the plug 303a of the optical fiber cable 303 where light is emitted (or received) are optically coupled.

The plug 303a is inserted in the plug insertion hole 302 of the holder 300 until the edge thereof contacts the optical element. Therefore, if the optical fiber cable 303 is narrowed as the projections 303b, the edge of the plug 303a and a lens of the optical element are damaged, which deteriorates the optical transmission.

In the third light transmission device, an axis of the spring 305 corresponds to the pivot 306 of the shutter 301 as shown in FIGS. 15(a) and 15(b). Further, as shown in FIG. 13(a), a part of the shutter 301 covering the pivot 306 is exposed when viewed from the open end of the plug insertion hole. (FIGS. 15(a) and 15(b) are sectional side views of the third light transmission device. FIG. 15(a) shows the state where the plug 303a is completely inserted and FIG. 15(b) shows the state where the plug 303a is being inserted or extracted in the midway of the plug insertion hole.) Accordingly, if the edge of the plug 303a is pressed against the shutter 301 covering the pivot 306 to insert the plug 303a, excessive load is applied to the pivot 306, which may possibly break the pivot 306.

To solve the above-mentioned problems, the present invention provides a light transmission device capable of strictly preventing dust and foreign objects from entering the plug insertion hole, without using the protective cap which must be stored when extracted.

SUMMARY OF THE INVENTION

According to the present invention, provided is a light transmission device comprising an optical fiber cable having a plug and a holder having a plug insertion hole into which the plug of the optical fiber cable is inserted, the holder containing an optical element exposed in the plug insertion hole for performing at least either emitting or receiving light so that the plug inserted in the plug insertion hole is optically coupled with the optical element, wherein an engaging projection is provided on an outer surface of the plug, an engaging groove corresponding with the projection is provided on a wall of the plug insertion hole, and a shutter for closing the plug insertion hole is provided, the shutter being opened and closed in the inside of the plug insertion hole by turning about a pivot extending substantially vertically or parallel to a line composed of an optional point in the groove and a point on a wall of the plug insertion hole rightly opposite to the optional point.

In the thus constructed light transmission device, the shutter is opened and closed in the inside of the plug insertion hole by turning about a pivot extending substantially vertically or parallel to the line composed of an optional point in the groove and a point on the wall of the plug insertion hole opposite to the optional point. Accordingly, the plug insertion hole is covered with the shutter and thus strictly protected from dust and other foreign objects without using the protective cap used in the prior art devices.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 15(a) and 15(b) are views illustrating the schematic structure of the light transmission device according to the embodiment of the present invention; FIG. 16(d) is a sectional side view cut along the line B—B in shown in FIG. 16(b) in which the shutter is closed, FIG. 16(e) corresponds to FIG. 3(b) and FIG. 16(f) is a sectional side view cut along the line C—C in FIG. 16(b) in which the shutter is opened.

DESCRIPTION OF THE PREFERRED EMBODIMENTS

Figure 1:
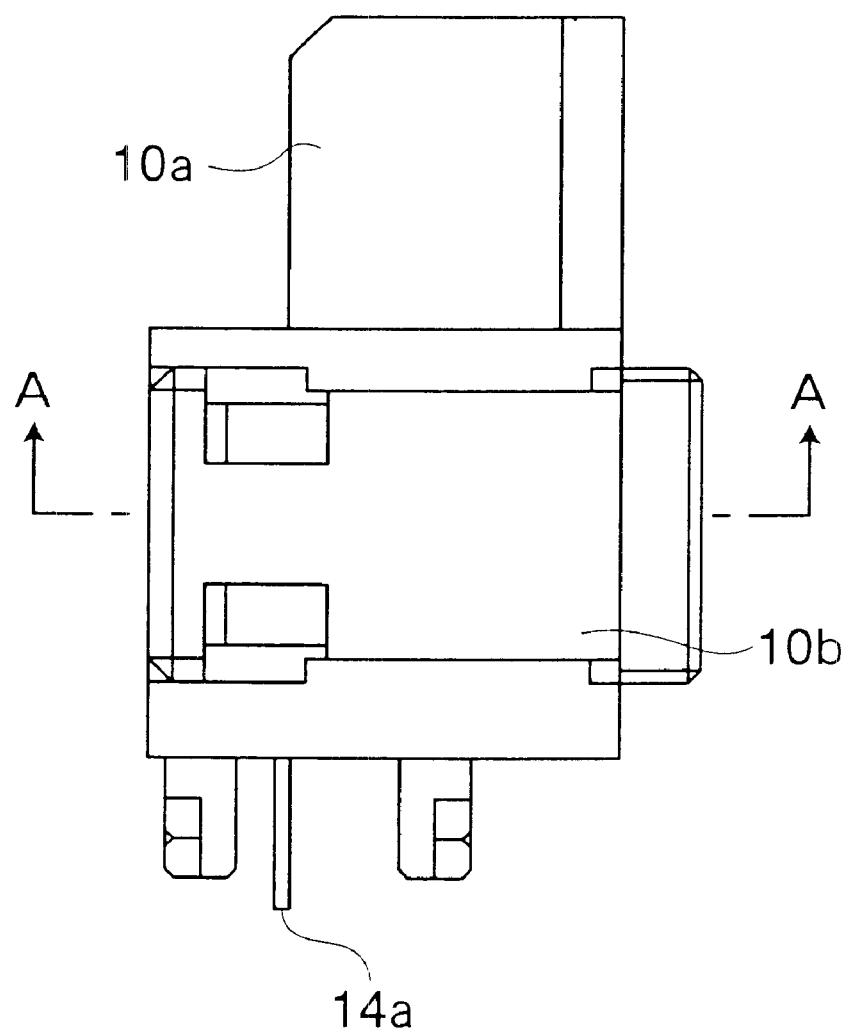
FIG. 1 is a side view illustrating a schematic structure of a light transmission device according to an embodiment of the present invention.

The light transmission device according to the present invention comprises an optical fiber cable and a holder. The optical fiber cable has a plug. The plug generally has a substantially square cross section. However, the cross section of the plug is not limited thereto and may substantially be triangle, polygon, circle, oval and the like.

The holder is provided with a plug insertion hole in which the plug of the optical fiber cable is inserted. The cross section of the plug insertion hole is selected depending on that of the plug of the optical fiber cable. The holder accommodates therein an optical element for performing at least either receiving or emitting light. That is, the optical element is positioned at the innermost of the plug insertion hole and a part of which is exposed in the plug insertion hole. When the plug is inserted in the plug insertion hole, an edge of the plug contacts an exposed surface of the optical element, which establishes optical coupling.

On an outer surface of the plug at least one projection is provided for engagement. The projection may be formed as one or more lines extending on the plug surface in the lengthwise direction of the optical fiber cable. The cross section of the projection may substantially be square, semi-circle and the like.

On the wall of the plug insertion hole a groove engaging with the projection is formed. The position, number, shape and size of the groove are determined as corresponding to those of the projection. The plug and the plug insertion hole are engaged with each other by inserting the projection into the groove.

In the light transmission device according to the present invention, a shutter for covering the plug insertion hole is provided. The shutter turns about a pivot extending along a specific direction within the plug insertion hole. That is, the shutter is constructed so that it can be opened inwardly. The pivot of the shutter is suitably selected from two kinds of them.

One of the pivots is a line extending substantially vertically to a line composed of an optional point in the groove and a point on the wall of the plug insertion hole rightly opposite to the optional point (a line orthogonal to the groove). If the shutter is opened by turning about this pivot, at least a part of the groove is covered by the shutter.

Another pivot is a line extending substantially parallel to the line orthogonal to the groove. If the shutter is opened by turning about this pivot, the whole groove remains exposed.

In the present invention, it is preferred that an end of the groove which is closed at the open end of the plug insertion hole is also covered with the shutter. That is, the shutter preferably has a convex portion or the like of the same shape as the section of the groove which moves without interfering the opening/closing of the shutter and covers the open end of the groove when the shutter is closed completely. This construction allows more reliable protection of the plug insertion hole against dust and foreign objects since the open end of the groove is also covered with the shutter.

In the light transmission device of the present invention, the shutter is preferably provided with a groove engaging with the projection of the plug so that the plug is guided along the groove of the shutter when the shutter is opened and the plug is insets in the plug insertion hole. According to this construction, the plug can be inserted in a predetermined position of the plug insertion hole and optically coupled with the optical element.

In the present invention, a front part of the shutter covering the pivot is preferably positioned inward from an open end of the plug insertion hole. According to the construction, even when an edge of the plug is pressed against the shutter to open it, the edge does not contact the front part of the shutter covering the pivot and thus the pivot is prevented from being damaged.

Further, the light transmission device of the present invention is preferably provided with an elastic member which enables the shutter which is being opened because the plug has been inserted in the plug insertion hole to be closed in accordance with the extraction of the plug from the plug insertion hole. This construction allows the shutter to be opened/closed in accordance with the insertion/extraction of the plug.

The elastic member in the light transmission device of the present invention is preferably a torsion coil spring having a pair of arms, one of which contacting a rear surface of the shutter and the other contacting the holder, for continuously biasing the shutter towards a direction of closing it. Accordingly, the shutter can successively be opened and closed with the use of the torsion coil spring which is a simple and inexpensive component.

The light transmission device of the present invention preferably includes a block in the plug insertion hole to restrict the degree of the insertion of the plug. According to the block (an abutting member), the degree of the plug insertion can be determined regardless of the configuration of the holder.

The block may be arranged in a suitable position, for example, at a side, bottom or top of the optical element located at the innermost of the plug insertion hole.

Where the pivot of the shutter is substantially vertical to the line orthogonal to the groove, a side of the holder to which the torsion coil spring for opening/closing the shutter is attached must be opened because of the structure of the torsion coil spring.

To cover the thus opened side of the holder (a main holder 10a), a sub holder 10b is engaged with the main holder 10a. The holder of the present invention is formed by engaging the main holder 10a and the sub holder 10b (FIG. 2). However, in the holder thus engaged, it is impossible to obtain a certain engagement force (EIAJ RC-5720) between the plug of the optical fiber cable inserted in the plug insertion hole and the holder.

Figure 16B:
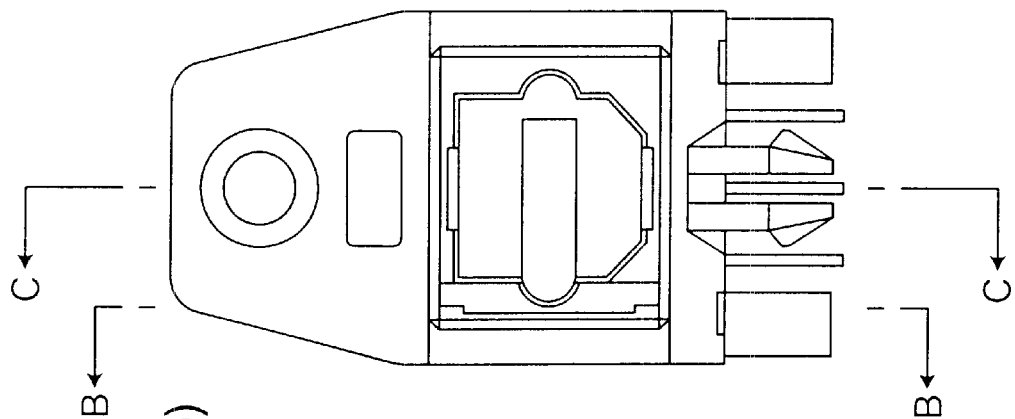
FIGS. 16(a) to 16(f) are views illustrating a support bar provided to a main holder for the purpose of increasing an engagement force between the device and the plug of the optical fiber cable, in which FIG. 16(a) corresponds to FIG. 1, FIG. 16(b) corresponds to FIG. 2(a), FIG. 16(c) corresponds to FIG. 3(a)
Figure 16A:
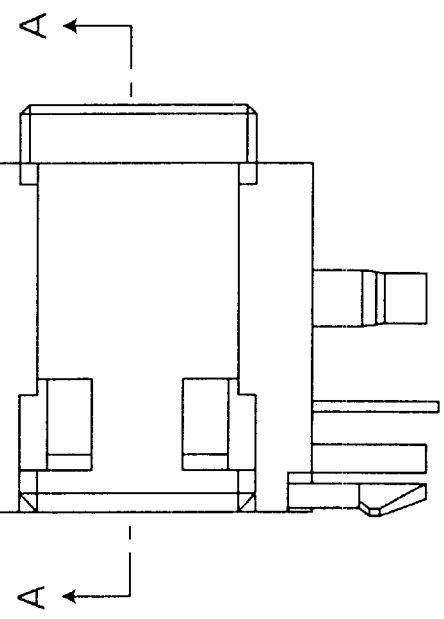
Figure 16D:
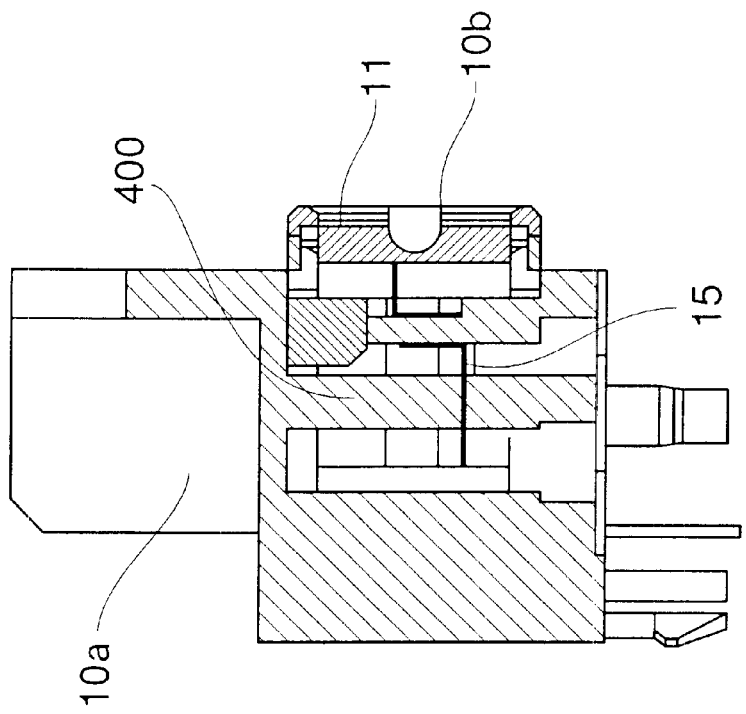
Figure 16C:
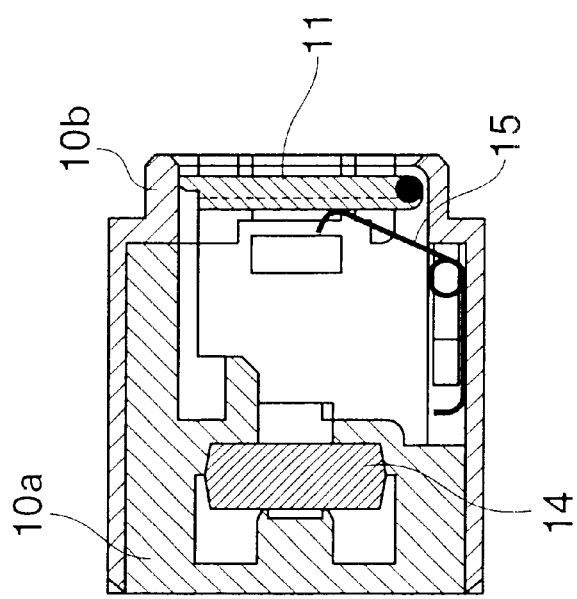
Figure 16E:
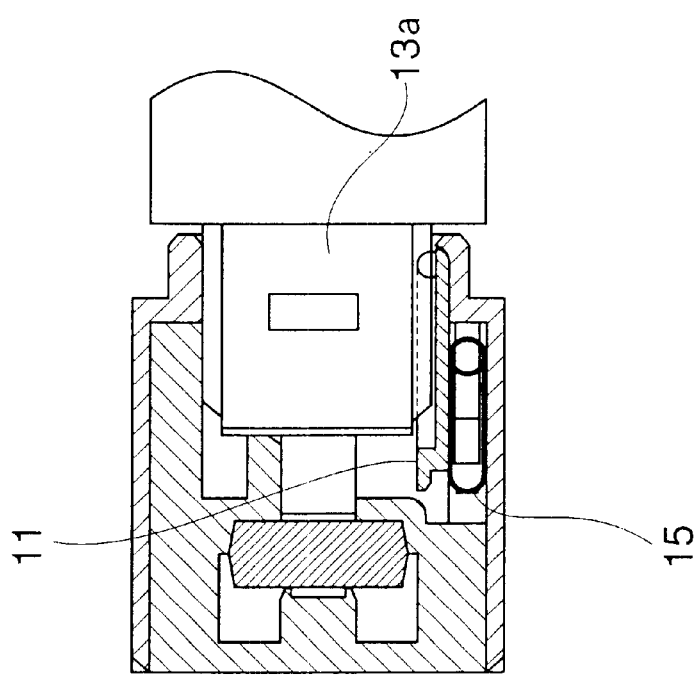
Figure 16F:
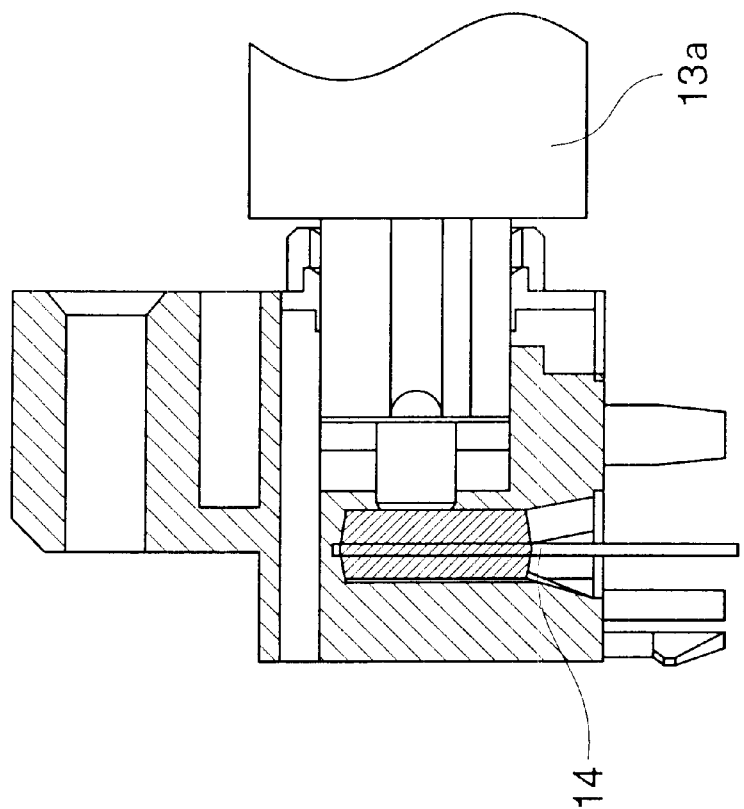

Therefore, it is preferred to provide a support column (400 in FIG. 16(d)) to the side to which the torsion coil spring is attached so that satisfactory engagement force is obtained at the insertion of the plug.

Hereinafter, the present invention will be described with reference of the drawings.

Figure 4A:
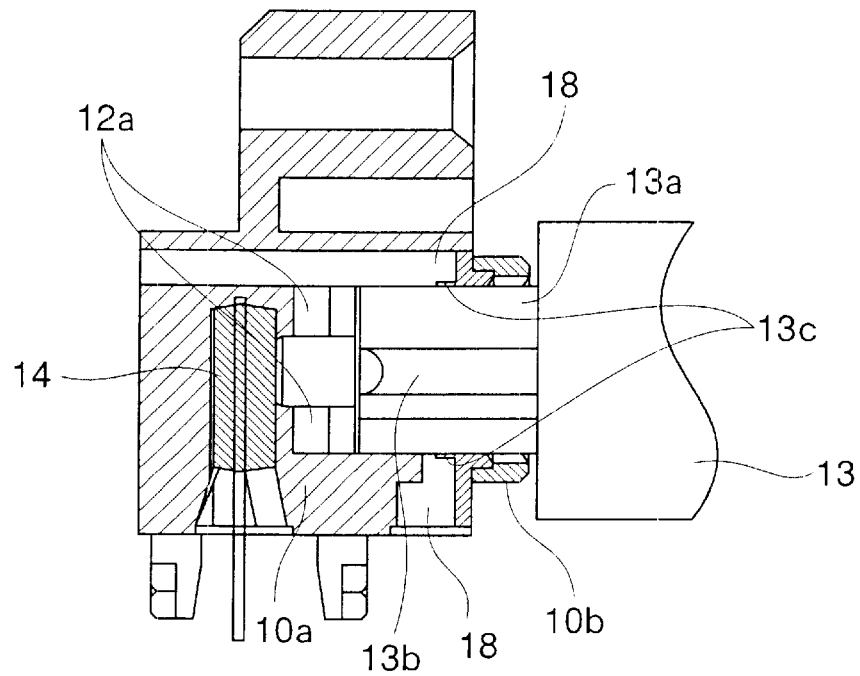
FIG. 4(a) is a sectional view cut along the line B—B shown in FIG. 2(a) in which the shutter is opened and FIG. 4(b) is a sectional side view cut along a line dividing a coil portion of a spring shown in FIG. 2(a) in which the shutter is opened.
Figure 4B:
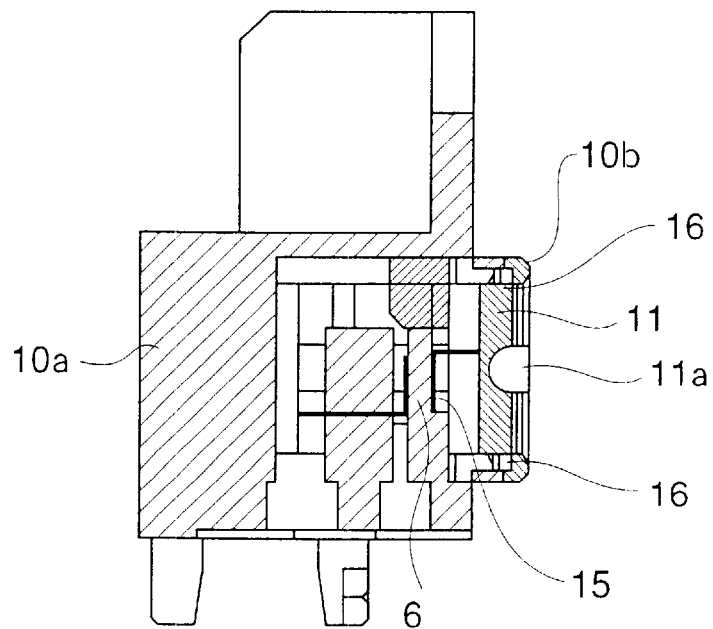

FIGS. 1 to 4(b) shows a schematic structure of a light transmission device according to a first embodiment. FIG. 1 is a side view of the light transmission device. FIGS. 2(a) and 2(b) are front views observed from an open end of the plug insertion hole in which the shutter is closed and opened, respectively. FIGS. 3(a) and 3(b) are cross-sectional views of an upper part of the light transmission device cut along the line A—A shown in FIG. 1 in which the shutter is closed and opened, respectively. FIG. 4(a) is a sectional side view cut along the line B—B shown in FIG. 2(a) in which the shutter is opened. FIG. 4(b) is a sectional side view cut along a line dividing a coil portion of the spring shown in FIG. 2(a) in which the shutter is opened.

The light transmission device according to the present embodiment comprises an optical element 14 for performing at least either receiving or emitting light and a holder (a main holder 10a and a sub holder 10b) which includes therein the optical element 14. A plug 13a of an optical fiber cable 13 is inserted in a plug insertion hole 12 in the holder so that the plug 13a and the optical element 14 are optically coupled. On a side of the plug 13a a belt-shaped engaging guide projection 13b is formed and a guide groove 17 engaging with the projection 13b is formed on a wall of the plug insertion hole 12. Further, a shutter 11 is provided to open/close in the inside of the plug insertion hole 12 by turning about a pivot 16 extending substantially vertically to a line composed of an optional point in the guide groove 17 and a point on the wall of the plug insertion hole 12 rightly opposite to the optional point.

In this embodiment, the plug 13a of the optical fiber cable 13 is in a cube form. When viewed in section, the guide projection 13b is formed on a pair of sides opposite to each other (right and left surfaces), respectively, and a convex hook 13c is formed on another pair of sides (top and bottom surfaces), respectively. The guide groove 17 corresponding to the guide projection 13b is formed in a pair of walls of the plug insertion hole 12 opposite to each other, respectively. Accordingly, the pivot 16 on which the shutter 11 turns is substantially vertical to a line which links the pair of guide grooves 17 formed on the walls of the plug insertion hole 12 opposite to each other. A pair of concave hooks 18 engaging with the convex hooks 13c is formed on another pair of walls of the plug insertion hole 12 opposite to each other, i.e., where the guide grooves 17 are not formed.

In the present embodiment, the holder is formed of a main holder 10a for holding the optical element 14, and a sub holder 10b in which the plug insertion hole 12 is formed and engaged with the main holder 10a at the front of the main holder 10a.

As shown in an outward appearance of FIG. 1, a lead terminal 14a of the optical element 14 is exposed.

Figure 2A:
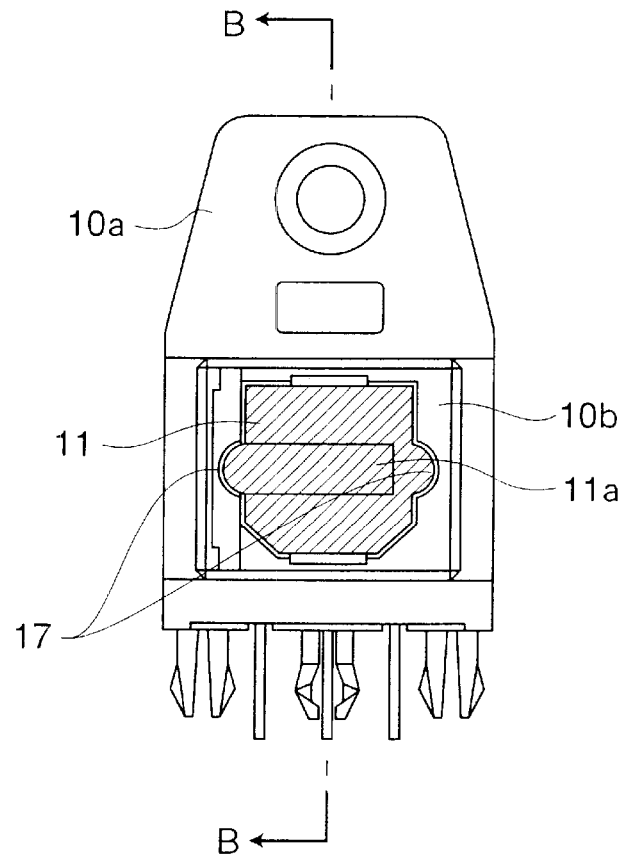
FIGS. 2(a) and 2(b) are front views illustrating the schematic structure of the light transmission device according to the embodiment of the present invention observed from an inlet of a plug insertion hole thereof, in which a shutter is closed and opened, respectively.
Figure 2B:
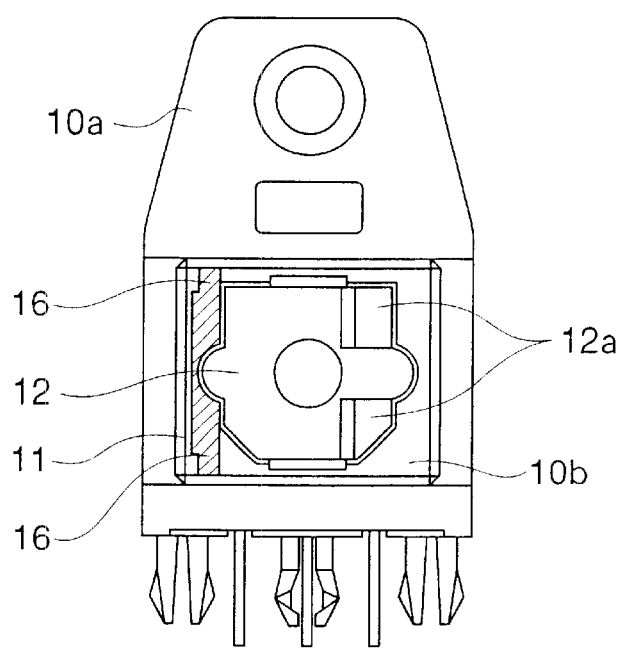
Figure 3A:
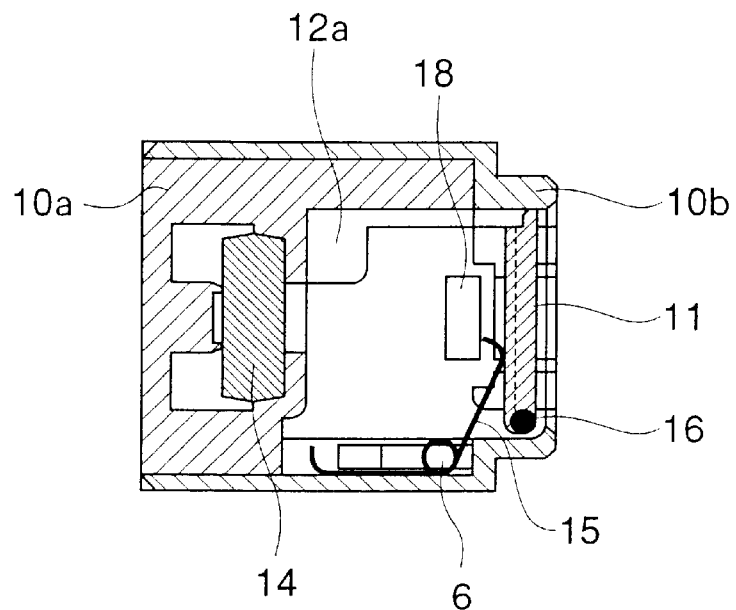
FIGS. 3(a) and 3(b) are sectional views cut along the line A—A in FIG. 1, in which the shutter is closed and opened, respectively.
Figure 3B:
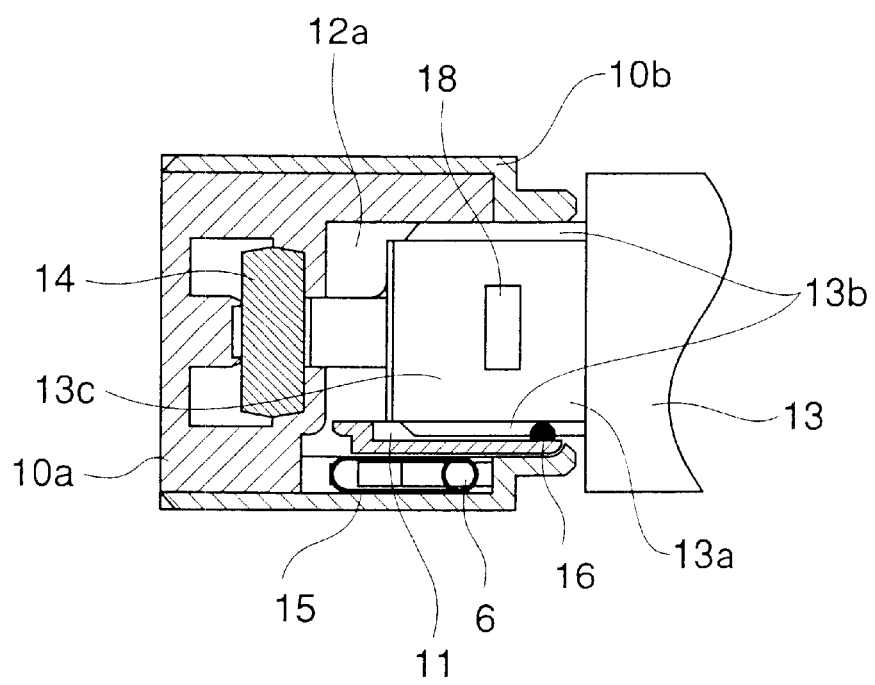

According to the light transmission device of the present embodiment, ends of the guide grooves 17 opened at the open end of the plug insertion hole are shut when the shutter 11 is closed as shown in FIG. 2(a).

In the present embodiment, the shutter 11 is provided with a guide groove 11a engaging with the guide projection 13b as shown in FIGS. 2(a) and 4(b).

Further, a front part of the shutter 11 which covers the pivot 16 is located inward from the open end (the inlet) of the plug insertion hole 12, i.e., within the sub holder 10b. That is, viewed from the inlet of the plug insertion hole 12, the pivot 16 is covered with and protected by the sub holder 10b. Accordingly, the pivot 16 can be protected from load which has been applied by pressing the plug 13a against the pivot 16 at the insertion thereof in the above-mentioned third light transmission device of the prior art.

According to the light transmission device of the present embodiment, the shutter 11 and the pivot 16 of the shutter are formed in one-piece. As shown in FIG. 4(b), the pivot 16 is engaged with a bearing formed on the sub holder 10b to support the shutter 11.

The light transmission device of the present embodiment includes a spring 15 as an elastic member for closing the shutter 11 which is being opened by the insertion of the plug 13a of the optical fiber cable 13, in accordance with the extraction of the plug 13a. The spring 15 has a pair of arms, one of which contacting a rear surface of the shutter 11 and the other contacting the sub holder 10b. The spring 15 is a torsion coil spring for biasing the shutter towards a direction of closing it. The arms of the spring 15 are substantially the same in length.

As shown in FIG. 3, the arms of the spring 15 turn about a pivot 6 which is substantially parallel to the pivot 16 of the shutter 11. The arms of the spring 15 have tip portions in the arc form contacting the rear surface of the shutter 11 and the sub holder 10b, respectively.

According to the light transmission device of the above-mentioned embodiment, the optical element 14 is included in the main holder 10a. The plug insertion hole 12 provided in the sub holder 10b is covered with the shutter 11 when the device is not used. The shutter 11 opens inwardly by turning about the vertical pivot provided at the side thereof in accordance with the insertion of the plug 13a of the optical fiber cable 13. The plug 13a is introduced to a predetermined position by the pair of guide projections 13b formed on the opposite sides of the plug 13a, the pair of guide grooves 17 formed on the opposite walls of the plug insertion hole 12 and the guide groove 11a provided with the shutter 11. The plug 13a is fixed to the predetermined position by the engagement established between the pair of convex hooks 13c formed on the other opposite sides of the plug 13a and the pair of concave hooks 18 formed on the other opposite walls of the plug insertion hole 12. Thus, optical coupling is established between the optical element 14 and the edge of the plug 13a where light is emitted (or received).

When the plug 13a is extracted after use, the arm of the spring 15 contacting the rear surface of the shutter 11 turns about the pivot 6, and then the shutter 11 turns about the pivot 16 under the returning force (elastic force) of the arm to contact an inner surface of the sub holder 10b. Thus, the plug insertion hole 12 is automatically closed.

As described above, the shutter 11 can be automatically opened/closed in accordance with the insertion/extraction of the plug 13a of the optical fiber cable 13.

When the shutter 11 covers the plug insertion hole 12, ends of the guide grooves 17 opened at the inlet of the plug insertion hole are also covered. Therefore, apertures observed in those positions in the third light transmission device are not formed. Thus, optical/mechanical coupling between the optical element 14 and the plug 13a of the optical fiber cable 13 is strictly protected from dust, flux used in a substrate assembly process and other foreign objects.

Further, the pivot 6 of the spring 15, which may require a relatively firm structure or increase its size depending on the position where the spring 15 is arranged, is provided inside the main holder 10a. Therefore, the size of the holder near the plug insertion hole observed in a side view is not increased as that of the third light transmission device of the prior art and thus the holder can be configured into almost the same size as that of the first light transmission device of the prior art as shown in FIG. 1(a) without the protective cap.

Further, the shutter 11 has the guide groove 11a, but does not form the concave hooks as those in the third light transmission device of the prior art. Therefore, the load applied to the pivot 16 of the shutter 11 at the insertion/extraction of the plug 13a is greatly reduced. Thus, the plug 13a is smoothly inserted/extracted while preventing damage to the pivot 16.

Further, the tip portions of the arms of the spring 15 are in the arc form (curved form) so as to realize smooth insertion/extraction of the plug 13a. That is, since the pivot 6 of the spring 15 does not correspond to the pivot 16 of the shutter 11, the tip portion slides along the rear surface of the shutter 11. With the arc form, the tip portion can slide smoothly without scratching the shutter and thus the smooth insertion/extraction of the plug 13a is realized.

For the smooth insertion/extraction of the plug 13a, a sliding groove along which the arm of the spring 15 travels may be formed on the rear surface of the shutter 11 or the rear surface may be mirror-polished.

Then, the construction of the light transmission device of the present embodiment will be described with reference to cross-sectional views of an upper part thereof shown in FIGS. 5(a), 5(b) and 6.

Figure 5A:
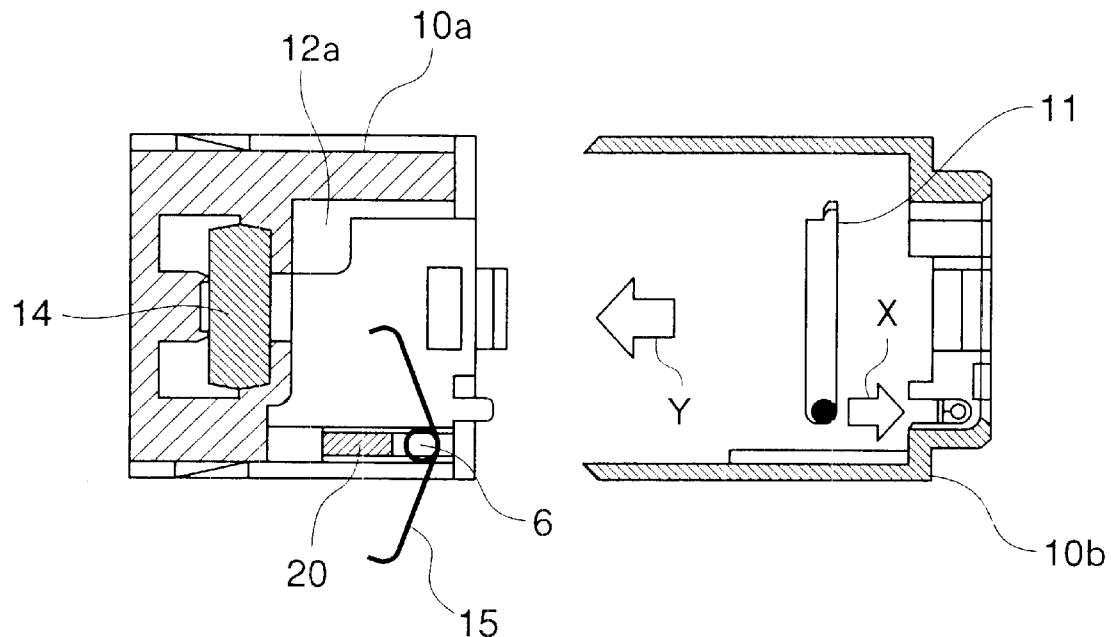
FIGS. 5(a) and 5(b) are cross-sectional views of an upper portion of the light transmission device illustrating the structure thereof according to the embodiment.
Figure 5B:
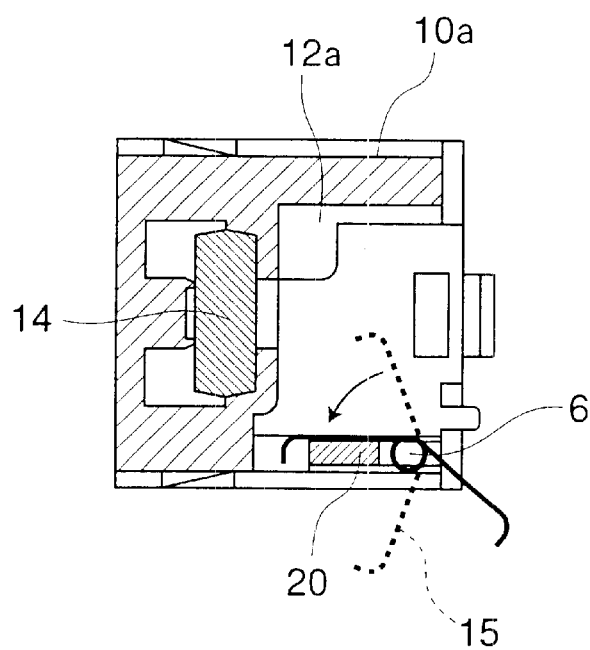

As shown in FIG. 5(a), the optical element 14 is accommodated in the main holder 10a and the spring 15 is attached by inserting a coiled portion of the spring 15 to the pivot 6. Since the arms of the spring 15 have the same length, erroneous insertion of the spring 15 as happened in the third light transmission device of the prior art is prevented. The pivot 6 may be a separate member made of metal or the like, or formed in one-piece with the main holder 10a using a resin material or the like.

The shutter 11 formed in one-piece with the pivot is attached to the sub holder 10b by engaging the pivot with a bearing provided to the sub holder 10b along the direction of X. Then, the sub holder 10b attached with the shutter 11 is engaged with the main holder 10a along the direction of Y.

In this case, if the spring 15 is constructed to turn uncontrollably, the arms of the spring 15 are reversed and thus correct attachment cannot be realized.

Accordingly, in this embodiment, a restriction means 20 for restricting the pivotal movement of the arms of the spring 15 is provided to the holder 10a between the arms of the spring 15. As shown in FIG. 5(b), the pivotal movement of one of the arms of the spring 15 contacting the rear surface of the shutter 11 is restricted by abutting on the restriction means 20 and therefore the arms of the spring 15 are not reversed. Thus, the main holder 10 and the sub holder 10b can be fitted together with the spring 15 fixed in the correct direction.

The restricting means 20 also has a function of restricting the degree of the opening of the shutter 11. When the shutter 11 is opened by the insertion of the plug 13a, the arm of the spring 15 contacting the rear surface of the shutter 11 abuts on the restricting means 20 and the movement thereof is stopped, i.e., the degree of the opening of the shutter 11 is restricted. Accordingly, even if the plug 13a is inserted along an oblique direction, the shutter 11 is prevented from being applied with excessive load, which enables the insertion of the plug 13a into a proper position.

Figure 6:
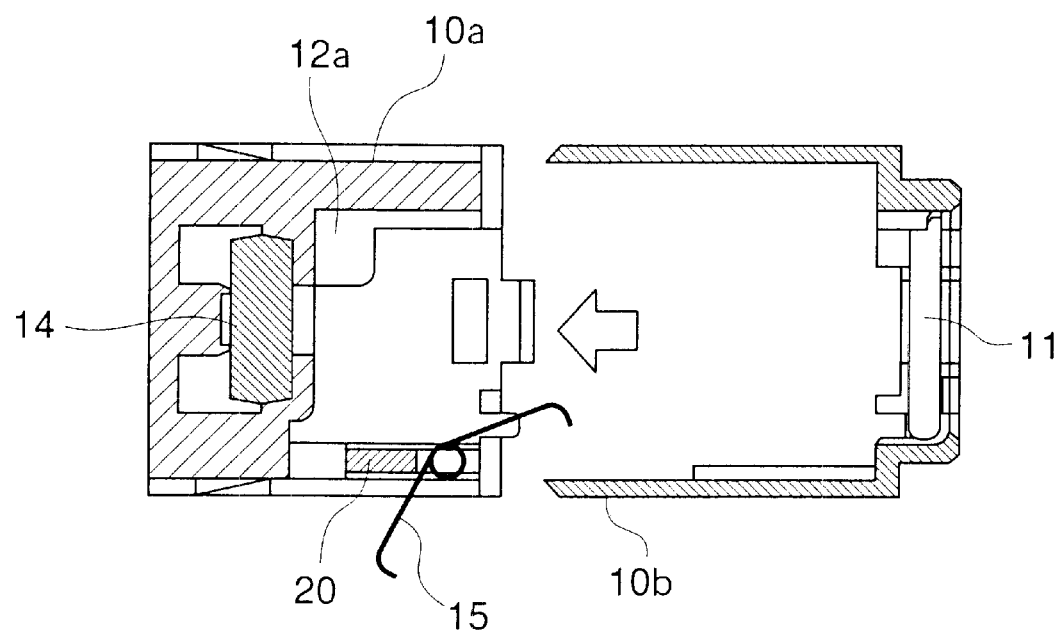
FIG. 6 is a cross-sectional view of an upper portion of the light transmission device illustrating the structure thereof according to the embodiment.

Further, there may be the case where the spring 15 is inappropriately attached as shown in FIG. 6. In such a case, the sub holder 10b is caught by the arc-shaped tip portion of the spring 15 when engaged with the main holder 10a, or the shutter 11 is not closed. Therefore it is clearly recognized that there is something wrong in the device. Thus, it is possible to prevent manufacturing of devices with incomplete shutter function.

In this embodiment, description is made to the cube-shaped plug 13a of the optical fiber cable 13 having a pair of guide grooves, but the present invention is not limited thereto.

Figure 7:
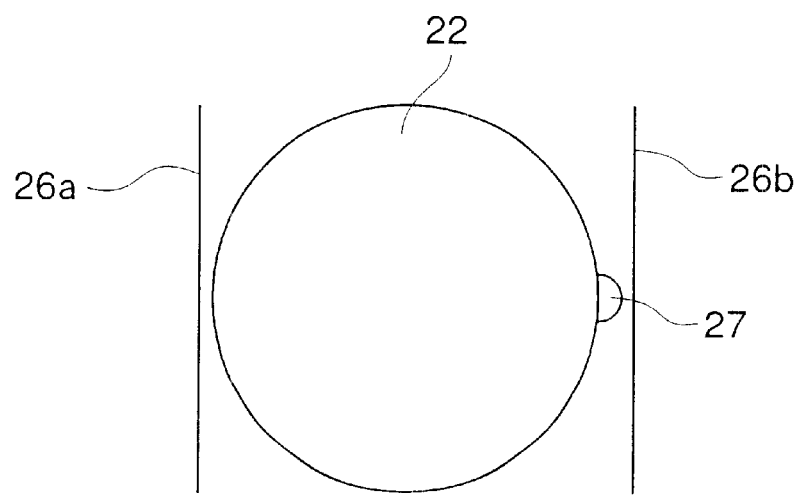
FIG. 7 is a front view illustrating a schematic structure of a circular plug insertion hole having a single groove observed from an inlet side.
Figure 8B:
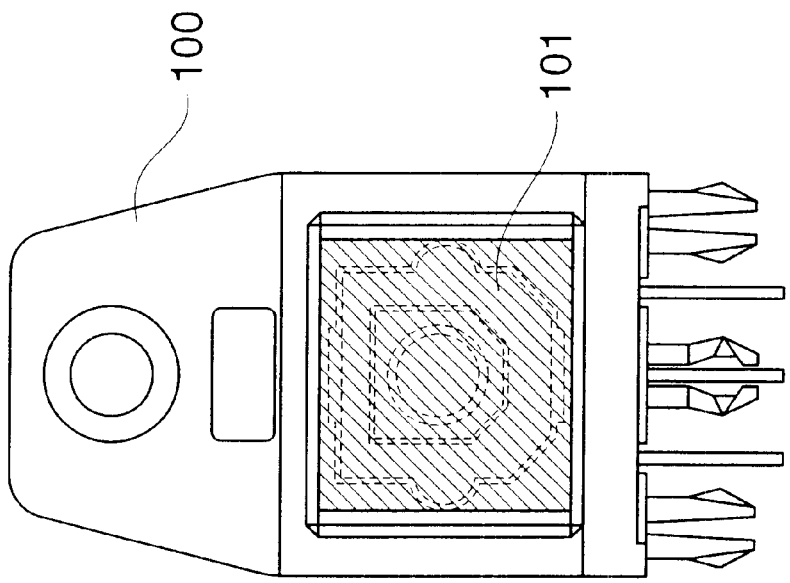
FIGS. 8(a) and 8(b) are views illustrating a schematic structure of a first light transmission device according to the prior art.
Figure 8A:
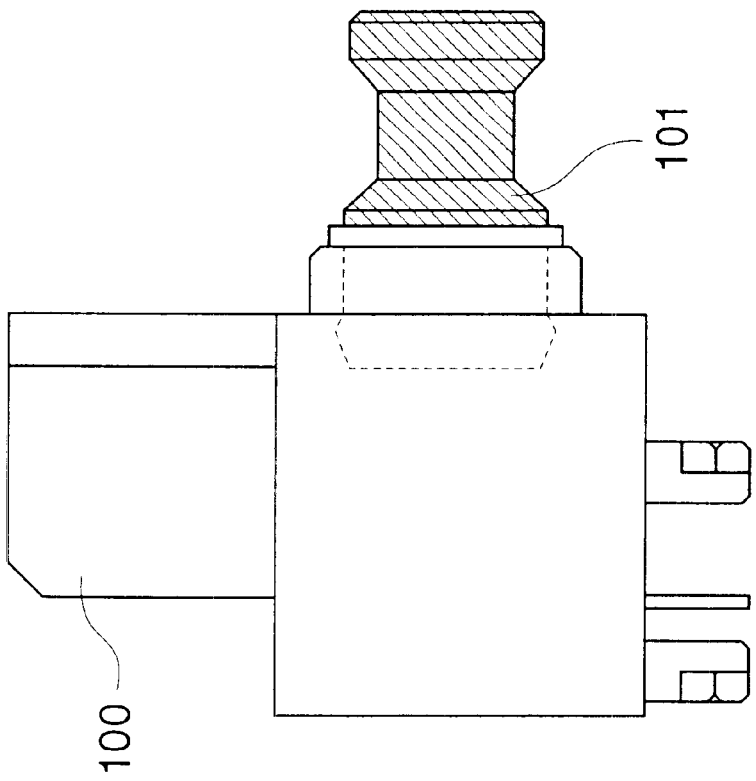
Figure 9B:
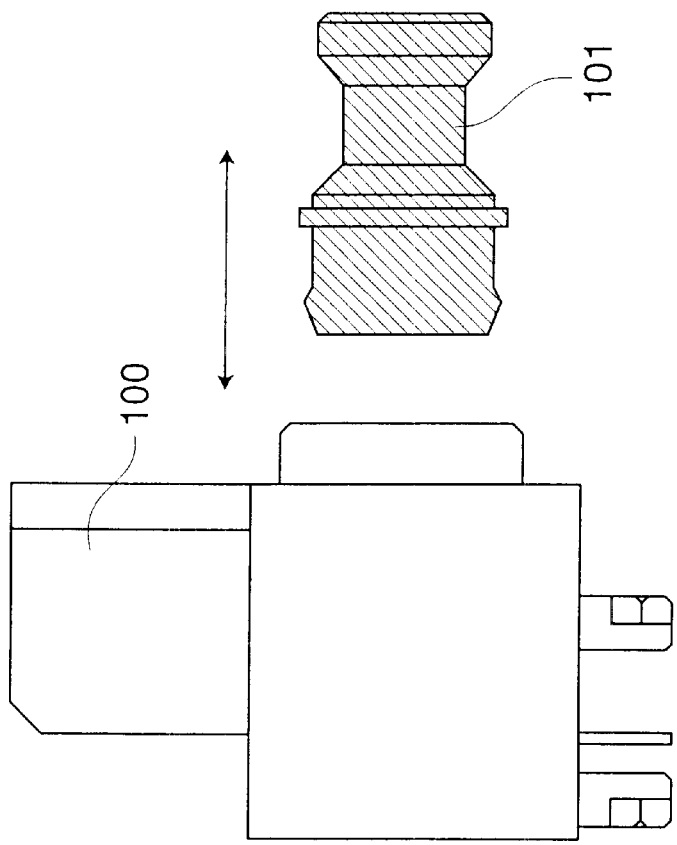
FIGS. 9(a) and 9(b) are views illustrating the schematic structure of the first light transmission device according to the prior art.
Figure 9A:
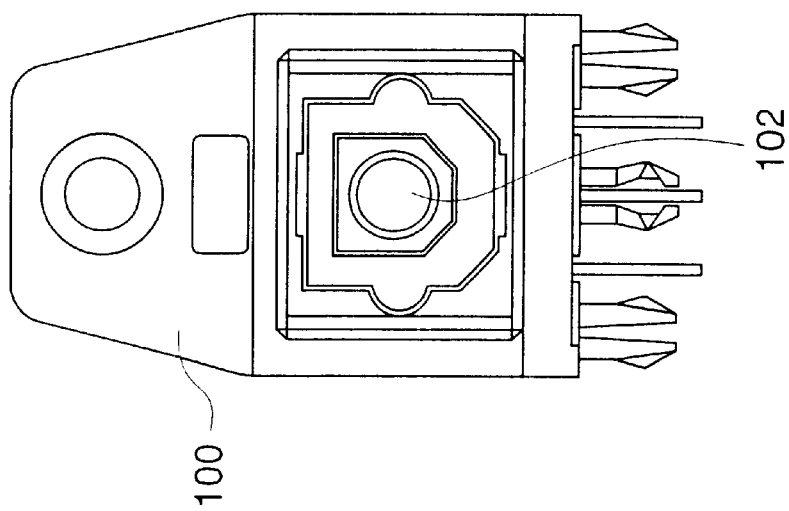
Figure 10B:
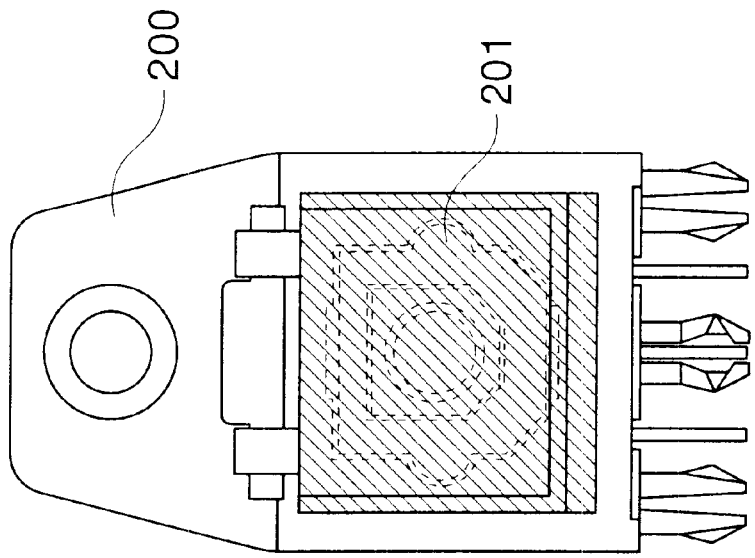
FIGS. 10(a) and 10(b) are views illustrating a schematic structure of a second light transmission device according to the prior art.
Figure 10A:
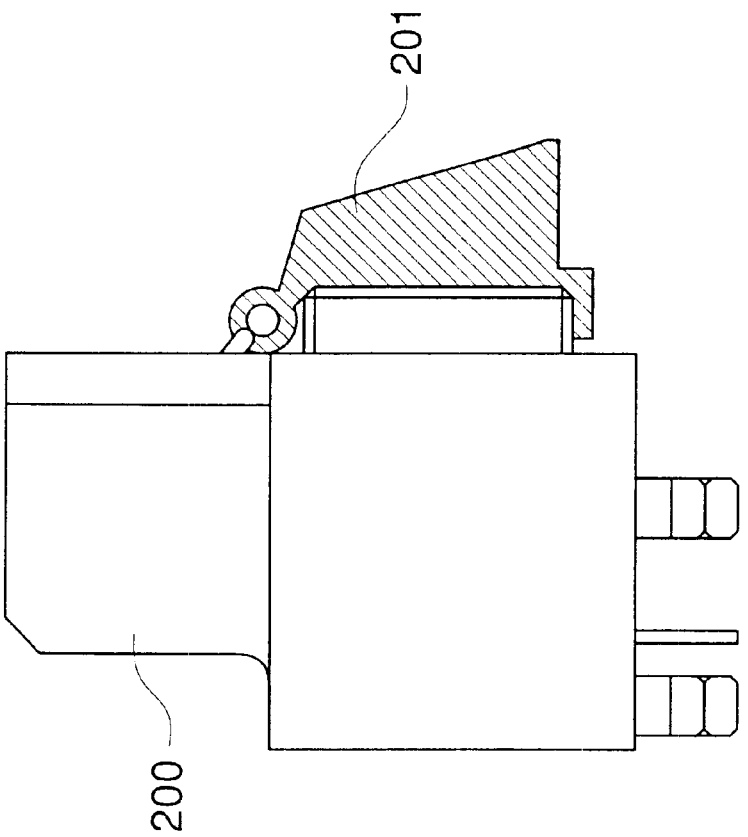
Figure 11B:
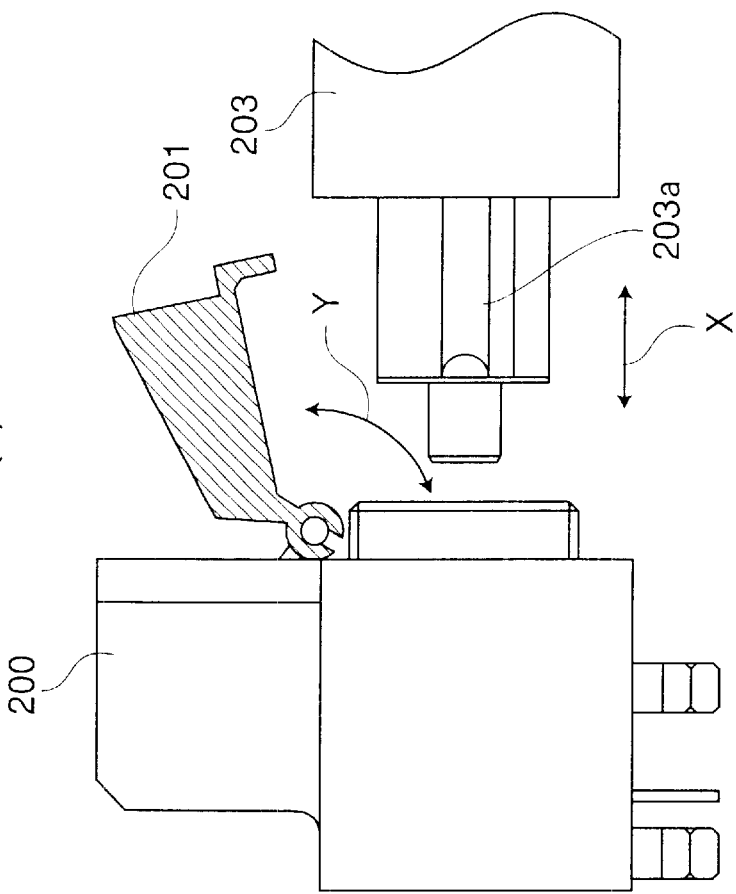
FIGS. 11(a) and 11(b) are views illustrating the schematic structure of the second light transmission device according to the prior art.
Figure 11A:
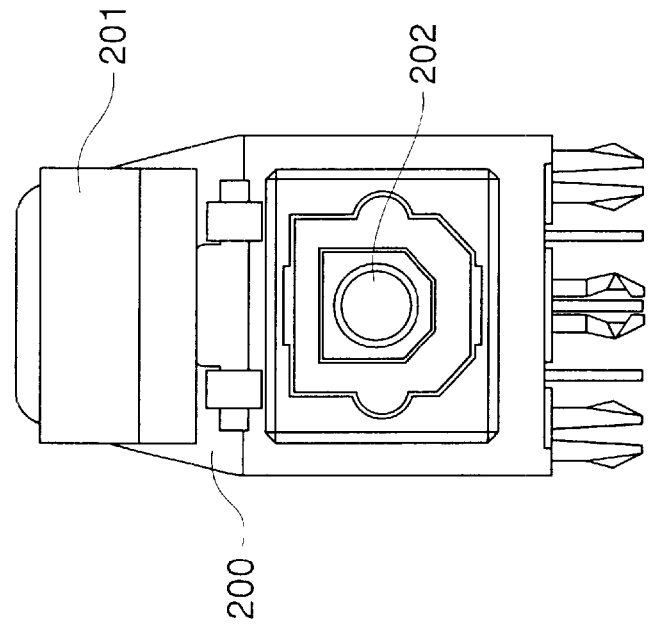
Figure 12B:
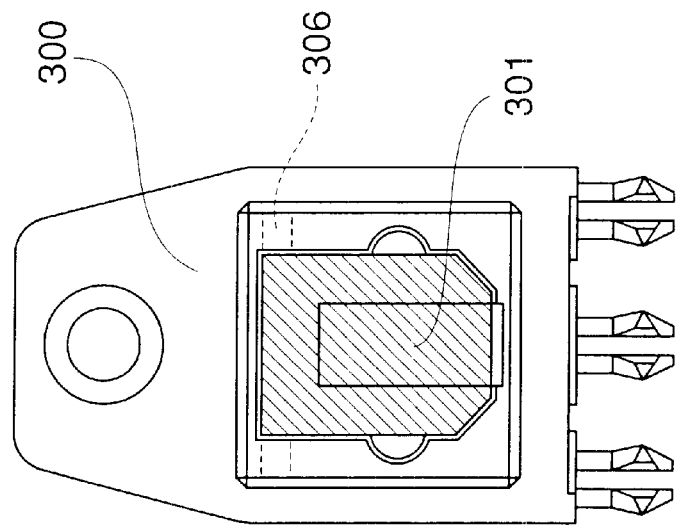
FIGS. 12(a) and 12(b) are views illustrating a schematic structure of the light transmission device according to the embodiment of the present invention.
Figure 12A:
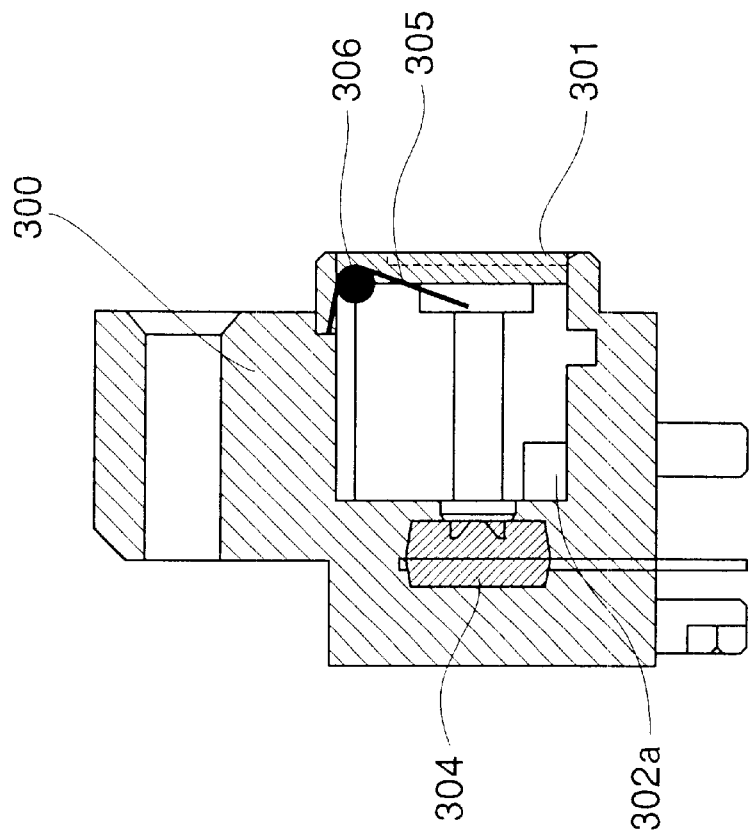

For example, as shown in FIG. 7 illustrating a view observed from the inlet the plug insertion hole, the present invention may be applied to a circular plug insertion hole having a single guide groove 27. In this case, a shutter turns about a pivot 26a or 26b which is vertical to a line composed of an optional point in the guide groove 27 and point on the inner wall of the plug insertion hole 22 opposite to the optional point. The light transmission device of such a structure can be formed in substantially the same manner as the above-mentioned embodiment except that the surface of the shutter may be curved in accordance with the circular shape of the plug insertion hole so that no apertures is left when the shutter is closed.

The cross section of the guide projection and the guide groove is not limited to the semicircle as described in the above embodiment, but may be in the shape of V or in a polygonal shape.

Figure 13B:
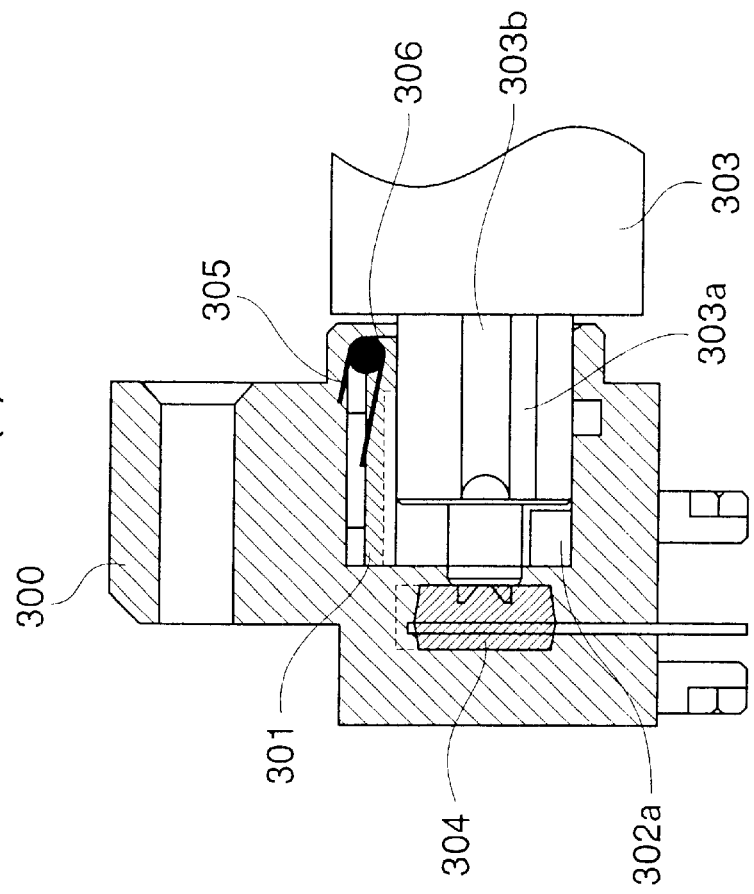
FIGS. 13(a) and 13(b) are views illustrating the schematic structure of the light transmission device according to the embodiment of the present invention.
Figure 13A:
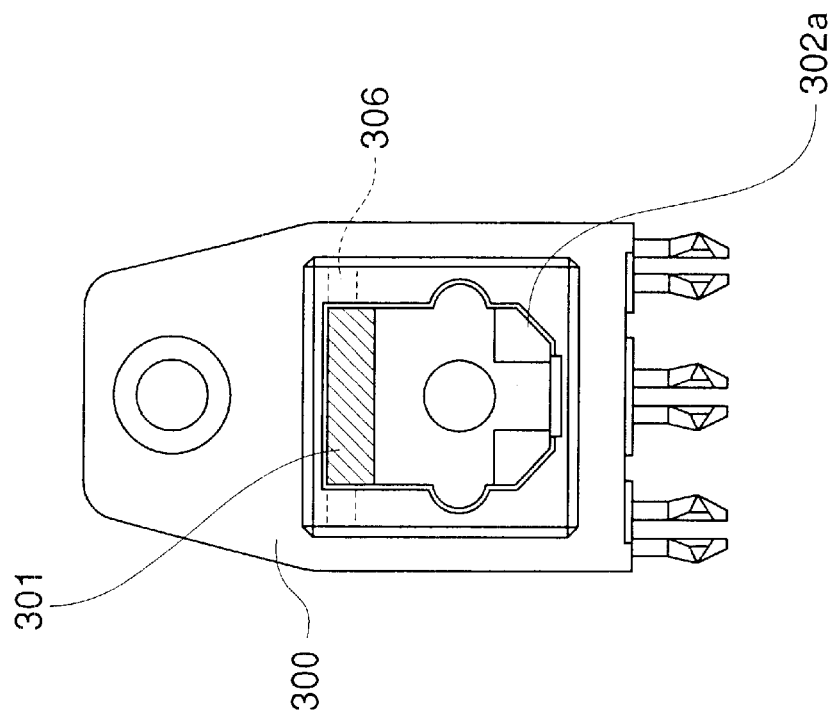
Figure 14B:
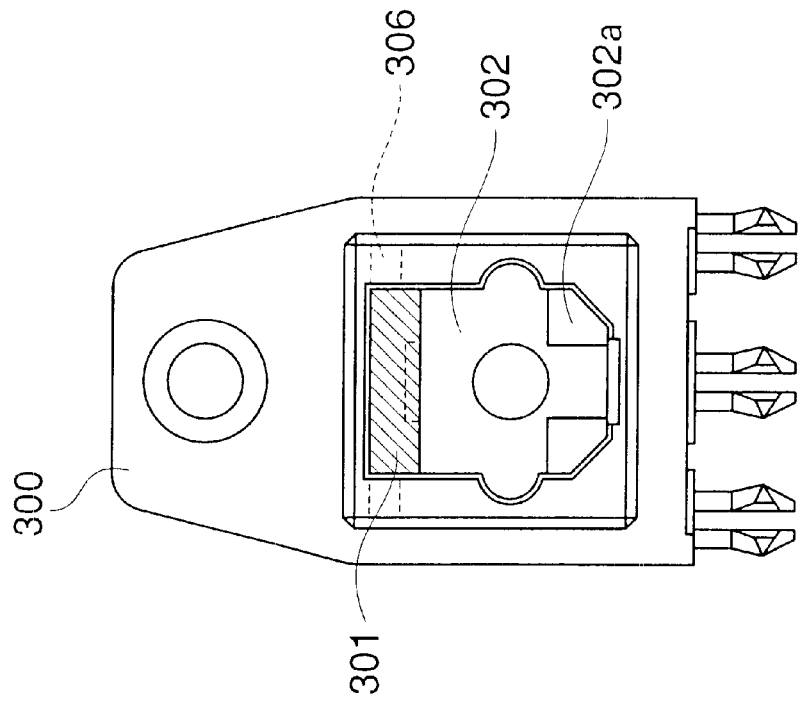
FIGS. 14(a) and 14(b) are views illustrating the schematic structure of the light transmission device according to the embodiment of the present invention.
Figure 14A:
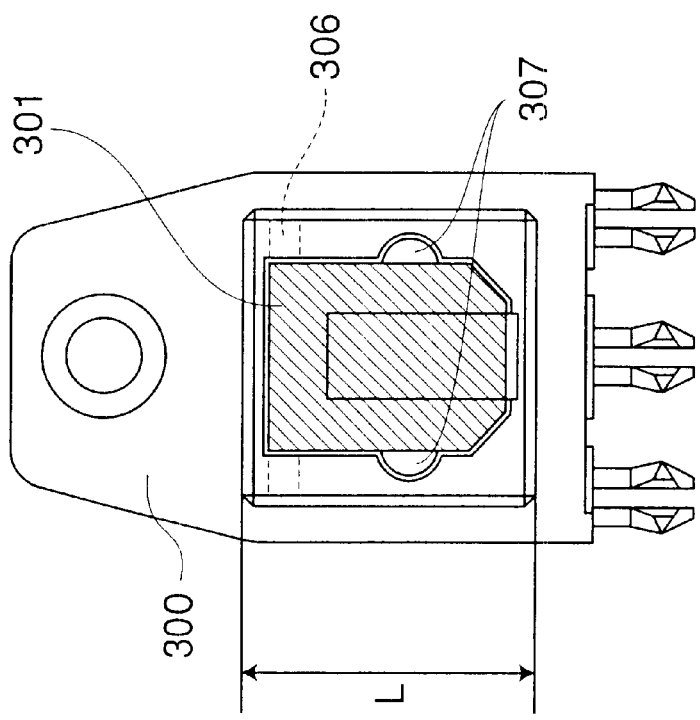

In the light transmission device of the present embodiment, the insertion of the optical fiber cable into the holder is restricted to a certain degree regardless of the configuration of the holder (300 in FIG. 13).

Therefore, a block 302a configured to correspond with the shape of the plug 303a is provided at a lower portion inside the plug insertion hole 302 shown in FIG. 13.

This construction is applied to the light transmission device in which the grooves are provided on the walls of the plug insertion hole so as to correspond to the belt-shaped projections provided on the sides of the plug of the optical fiber cable, and the shutter is provided which opens/closes in the inside of the plug insertion hole by turning about a pivot extending substantially parallel to a line composed of an optional point in the groove in the plug insertion hole and a point on the wall of the plug insertion hole opposite to the optional point.

In the light transmission device in which the grooves are provided in the walls of the plug insertion hole so as to correspond to the belt-shaped projections provided on the sides of the plug of the optical fiber cable, and the shutter is provided which opens/closes in the inside of the plug insertion hole by turning about a pivot extending substantially vertically to a line composed of an optional point in the groove in the plug insertion hole and a point on the wall of the plug insertion hole opposite to the optional point, blocks 12a configured to correspond to the shape of the plug 13c are provided at a side portion inside the plug insertion hole 12 shown in FIGS. 2 and 3.

Further, in the light transmission device in which the grooves are provided on the walls of the plug insertion hole so as to correspond to the belt-shaped projections provided on the sides of the plug of the optical fiber cable, and the shutter is provided which opens/closes in the inside of the plug insertion hole by turning about a pivot extending substantially vertically to a line composed of an optional point in the groove in the plug insertion hole and a point on the wall of the plug insertion hole opposite to the optional point, the holder is provided by engaging the main holder 10a and the sub holder 10b and a support column (400 in FIG. 16(d)) is provided to the main holder 10a.

What is claimed is:

1. A light transmission device comprising an optical fiber cable having a plug and a holder having a plug insertion hole into which the plug of the optical fiber cable is inserted, the holder containing an optical element exposed in the plug insertion hole for performing at least either emitting or receiving light so that the plug inserted in the plug insertion hole is optically coupled with the optical element, wherein
an engaging projection is provided on an outer surface of the plug, an engaging groove corresponding with the projection is provided on a wall of the plug insertion hole, and a shutter for closing the plug insertion hole is provided, the shutter being opened and closed in the inside of the plug insertion hole by turning about a pivot extending substantially vertically or parallel to a line composed of an optional point in the groove and a point on a wall of the plug insertion hole rightly opposite to the optional point.

2. A light transmission device according to claim 1, wherein an open end of the engaging groove at an inlet of the plug insertion hole is also covered with the shutter when the shutter is closed.

3. A light transmission device according to claim 1, wherein the shutter is provided with an engaging groove corresponding to the projection so that the projection is guided along the groove when the shutter is opened and the plug is inserted in the plug insertion hole.

4. A light transmission device according to claim 1, wherein a front part of the shutter corresponding to the pivot is located inward from an inlet of the plug insertion hole of the holder.

5. A light transmission device according to claim 1 further comprised of an elastic member for closing the shutter which is opened by the insertion of the plug into the plug insertion hole, in accordance with the extraction of the plug from the plug insertion hole.

6. A light transmission device according to claim 5, wherein the elastic member is a torsion coil spring having a pair of arms, one of which contacting a rear surface of the shutter and the other contacting the holder so that the shutter is biased towards a direction of closing it.

7. A light transmission device according to claim 1, wherein a block for restricting the degree of the insertion of the plug in the plug insertion hole is provided in the plug insertion hole.

8. A light transmission device according to claim 1, wherein, in the case where the pivot extends substantially vertically to the line, a block for restricting the degree of insertion of the plug is provided on a side part of an innermost portion of the plug insertion hole.

9. A light transmission device according to claim 1, wherein, in the case where the pivot is substantially parallel to the line, a block for restricting the degree of insertion of the plug is provided on a lower part of an innermost portion of the plug insertion hole.

10. A light transmission device according to claim 1, wherein, in the case where the pivot is substantially parallel to the line, a block for restricting the degree of insertion of the plug is provided on an upper part of an innermost portion of the plug insertion hole.

11. A light transmission device according to claim 6, wherein, in the case where the pivot is substantially vertically to the line, a support column is provided to a surface on which the torsion coil spring is attached so that a predetermined engagement force at the insertion of the plug into the plug insertion hole is obtained.

* * * * *